United States Patent
Tsai et al.

(10) Patent No.: US 11,604,943 B2
(45) Date of Patent: Mar. 14, 2023

(54) DOMAIN ADAPTATION FOR STRUCTURED OUTPUT VIA DISENTANGLED REPRESENTATIONS

(71) Applicant: NEC Laboratories America, Inc., Princeton, NJ (US)

(72) Inventors: Yi-Hsuan Tsai, San Jose, CA (US); Samuel Schulter, Santa Clara, CA (US); Kihyuk Sohn, Fremont, CA (US); Manmohan Chandraker, Santa Clara, CA (US)

(73) Assignee: NEC Corporation

( * ) Notice: Subject to any disclaimer, the term of this patent is extended or adjusted under 35 U.S.C. 154(b) by 987 days.

(21) Appl. No.: 16/400,376

(22) Filed: May 1, 2019

(65) Prior Publication Data
US 2019/0354807 A1    Nov. 21, 2019

Related U.S. Application Data

(60) Provisional application No. 62/672,572, filed on May 16, 2018.

(51) Int. Cl.
*G06K 9/62* (2022.01)
*G06N 3/08* (2006.01)

(52) U.S. Cl.
CPC ........... *G06K 9/6257* (2013.01); *G06K 9/628* (2013.01); *G06K 9/6218* (2013.01);
(Continued)

(58) Field of Classification Search
CPC .. G06K 9/6257; G06K 9/6218; G06K 9/6235; G06K 9/628; G06K 2009/6237; G06N 3/08
See application file for complete search history.

(56) References Cited

U.S. PATENT DOCUMENTS 10,466,717 B1 * 11/2019 Su .......................... G06N 3/08
2017/0356976 A1 * 12/2017 Shapiro ................ G06V 20/698
(Continued)

OTHER PUBLICATIONS

Hoffman, "FCNs in the Wild: Pixel-Level Adversarial and Constraint-Based Adaptation", arXiv:1612.02649 Dec. 2016, 9 pages.
(Continued)

*Primary Examiner* — Qun Shen
(74) *Attorney, Agent, or Firm* — Joseph Kolodka

(57) ABSTRACT

Systems and methods for domain adaptation for structured output via disentangled representations are provided. The system receives a ground truth of a source domain. The ground truth is used in a task loss function for a first convolutional neural network that predicts at least one output based on inputs from the source domain and a target domain. The system clusters the ground truth of the source domain into a predetermined number of clusters, and predicts, via a second convolutional neural network, a structure of label patches. The structure includes an assignment of each of the at least one output of the first convolutional neural network to the predetermined number of clusters. A cluster loss is computed for the predicted structure of label patches, and an adversarial loss function is applied to the predicted structure of label patches to align the source domain and the target domain on a structural level.

16 Claims, 6 Drawing Sheets

(52) U.S. Cl.
CPC ............. *G06K 9/6235* (2013.01); *G06N 3/08* (2013.01); *G06K 2009/6237* (2013.01)

(56) References Cited

U.S. PATENT DOCUMENTS

| | | | | |
|---|---|---|---|---|
| 2019/0197401 | A1* | 6/2019 | Jaganathan | G06N 3/0481 |
| 2019/0244059 | A1* | 8/2019 | Kolouri | G06V 10/454 |
| 2019/0332896 | A1* | 10/2019 | Liang | G06V 10/764 |
| 2020/0020098 | A1* | 1/2020 | Odry | G06K 9/6244 |
| 2020/0163641 | A1* | 5/2020 | Amit | G16H 30/40 |
| 2020/0380675 | A1* | 12/2020 | Golden | G16H 50/70 |

OTHER PUBLICATIONS

Tsai, "Learning to Adapt Structured Output Space for Semantic Segmentation", CVPR, Oct. 2018, 10 pages.

Dena, "Conditional Image Synthesis with Auxiliary Classifier GANs", ICML, Jul. 2017, 12 pages.

* cited by examiner

DOMAIN ADAPTATION FOR STRUCTURED OUTPUT VIA DISENTANGLED REPRESENTATIONS

RELATED APPLICATION INFORMATION

This application claims priority to U.S. Provisional Patent Application No. 62/672,572, filed on May 26, 2018, incorporated herein by reference herein its entirety.

BACKGROUND

Technical Field

The present invention relates to domain management and more particularly to transferring information between domains.

Description of the Related Art

Two sets of images from different domains may describe different weather or lighting conditions under which the images have been captured. In addition, different architectural styles of buildings or types of roads may appear in different cities. To avoid collecting training data for a certain task (e.g., semantic segmentation) in both domains, which is expensive and labor intensive, users and/or systems transfer knowledge acquired in one domain to the other domain. Given annotated training data only in one domain, the users and/or systems attempt to train a function that maximizes the performance on both domains.

SUMMARY

According to an aspect of the present invention, a method is provided for domain adaptation for structured output via disentangled representations. The method includes receiving a ground truth of a source domain. The ground truth is used in a task loss function for a first convolutional neural network that predicts at least one output based on inputs from the source domain and a target domain. The method also includes clustering the ground truth of the source domain into a predetermined number of clusters, and predicting, via a second convolutional neural network, a structure of label patches. The structure includes an assignment of each of the at least one output of the first convolutional neural network to the predetermined number of clusters. The method includes computing, by a processor device, a cluster loss for the predicted structure of label patches. The method also includes applying an adversarial loss function to the predicted structure of label patches to align the source domain and the target domain on a structural level.

According to another aspect of the present invention, a system is provided for structured output via disentangled representations. The system receives a ground truth of a source domain. The ground truth is used in a task loss function for a first convolutional neural network that predicts at least one output based on inputs from the source domain and a target domain. The system clusters the ground truth of the source domain into a predetermined number of clusters, and predicts, via a second convolutional neural network, a structure of label patches. The structure includes an assignment of each of the at least one output of the first convolutional neural network to the predetermined number of clusters. A cluster loss is computed for the predicted structure of label patches, and a loss function is applied to the predicted structure of label patches to determine an adversarial loss to align the source domain and the target domain on a structural level.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present invention, systems and methods are provided for determining structured output via disentangled representations. The system receives a ground truth of a source domain. The ground truth label patches are clustered into K categories, which are then used as additional classification loss on the label space and encourage the different types of structures in the labels to be separated. Consequently, the underlying feature representation gets disentangled Embodiments disclosed herein cluster label patches and introduces a different form of supervision for the convolutional neural network (CNN) that is to be trained and enables additional regularization between the source domain and a target domain. The process increases the quality of feature representations when compared to systems that do not use the method for determining structured output via disentangled representations. Regularization is a technique that makes slight modifications to a learning model such that the model generalizes better. This can in turn improve the model's performance on unseen data. Regularization encourages the features of images from both domains to follow the same distribution. The regularization is added to the standard task-specific training signal and can be computed without annotations of the data. There are several possible levels where this regularization can be applied, for example, at the input image level, the feature level or the output (label space) level.

Figure 1:
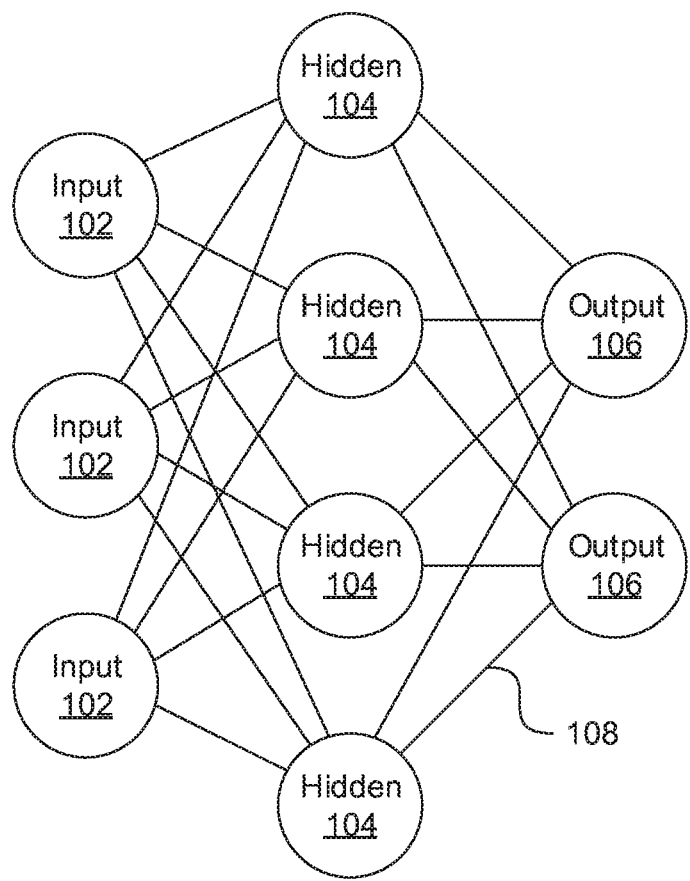
FIG. 1 is a generalized diagram of a neural network, in accordance with an embodiment of the present invention.

Referring now to FIG. 1, a generalized diagram of a neural network is shown.

An artificial neural network (ANN) is an information processing system that is inspired by biological nervous systems, such as the brain. The key element of ANNs is the structure of the information processing system, which includes many highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network generally has input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
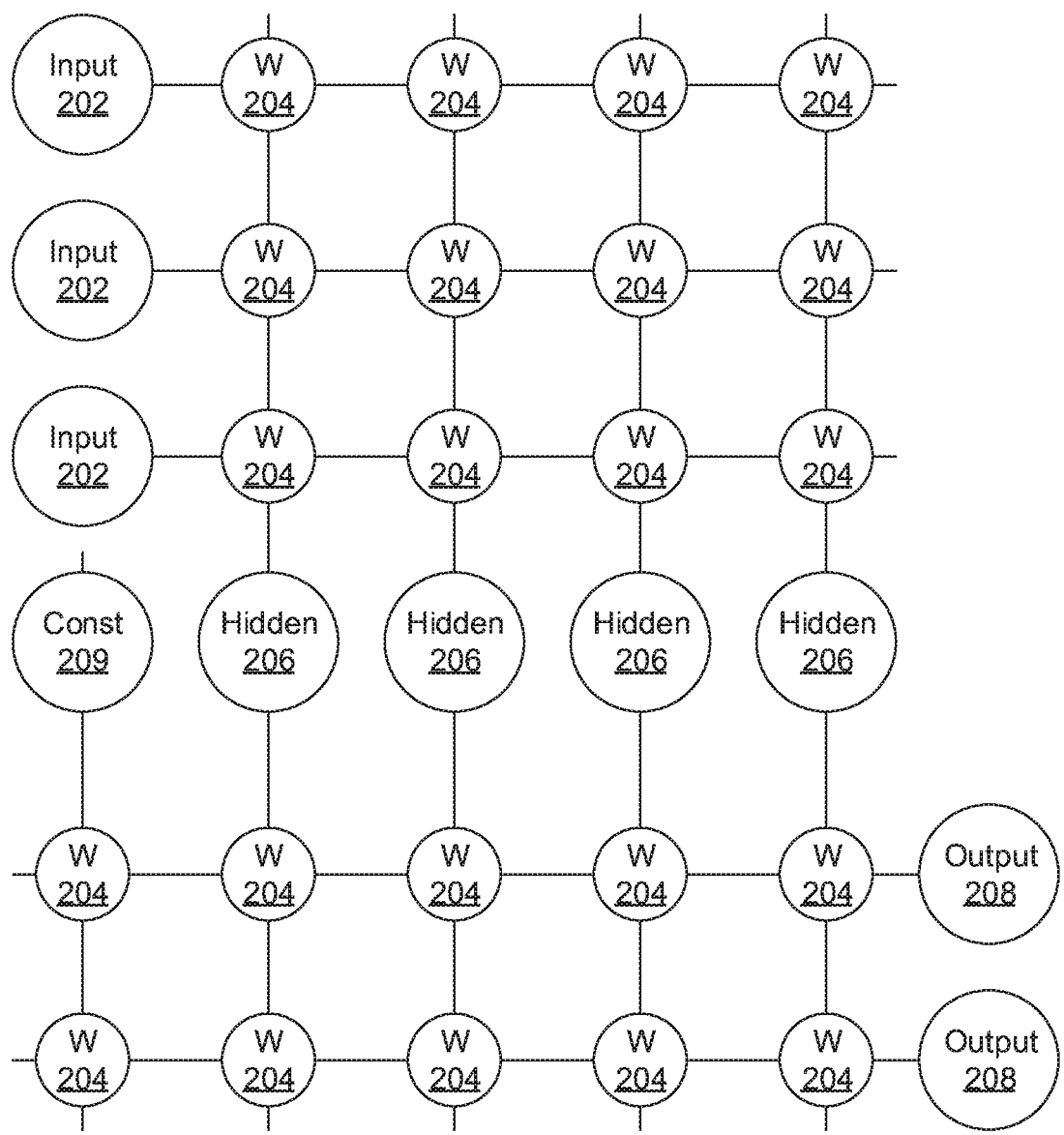
FIG. 2 is a diagram of an artificial neural network (ANN) architecture, in accordance with an embodiment of the present invention.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back-propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

A convolutional neural networks (CNN) is a subclass of ANNs which has at least one convolution layer. A CNN consists of an input and an output layer, as well as multiple hidden layers. The hidden layers of a CNN consist of convolutional layers, rectified linear unit (RELU) layer (e.g., activation function), pooling layers, fully connected layers and normalization layers. Convolutional layers apply a convolution operation to the input and pass the result to the next layer. The convolution emulates the response of an individual neuron to visual stimuli.

CNNs can be applied to analyzing visual imagery. CNNs can capture local information (e.g., neighbor pixels in an image or surrounding words in a text) as well as reduce the complexity of a model (to allow, for example, faster training, requirement of fewer samples, and reduction of the chance of overfitting).

CNNs use a variation of multilayer perceptrons designed to require minimal preprocessing. CNNs are also known as shift invariant or space invariant artificial neural networks (SIANN), based on their shared-weights architecture and translation invariance characteristics. CNNs can be used for applications in image and video recognition, recommender systems, image classification, medical image analysis, and natural language processing.

Figure 3:
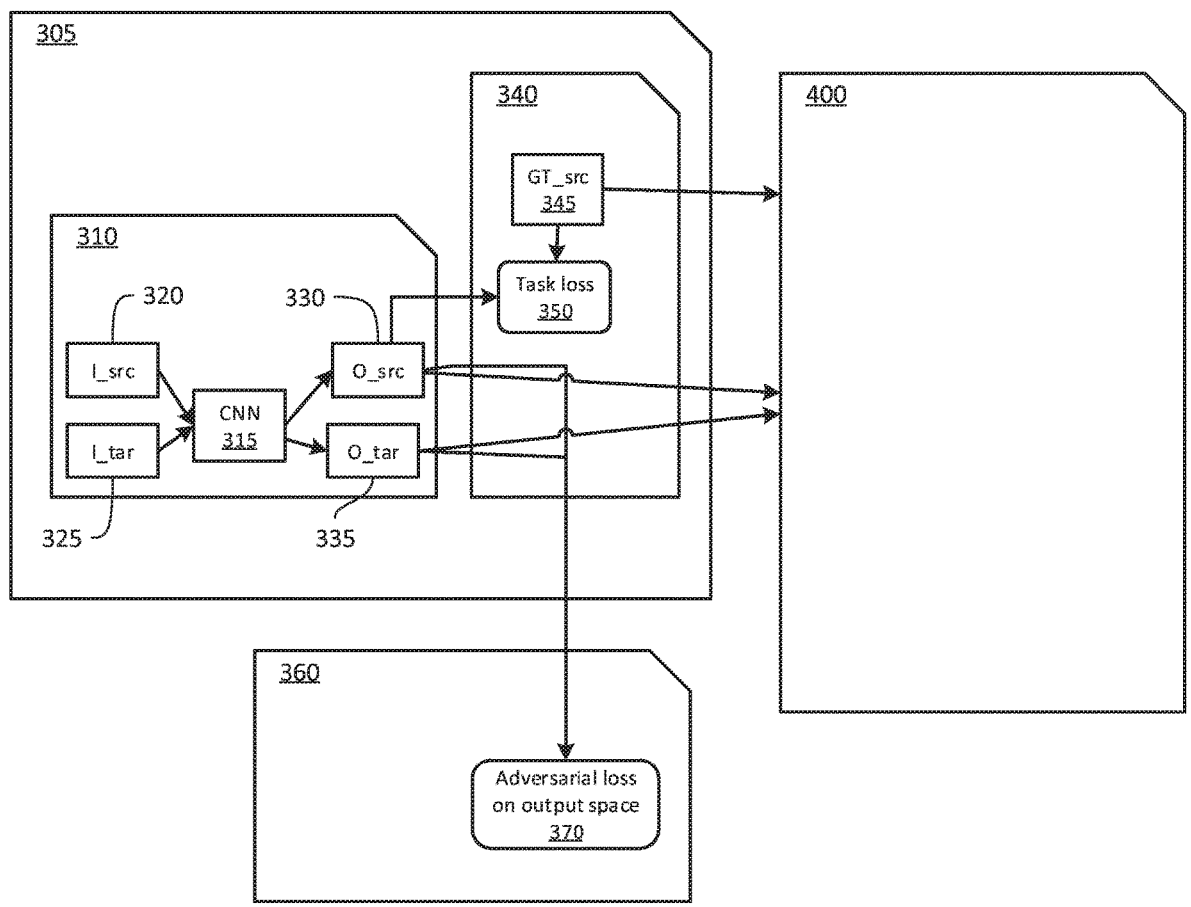
FIG. 3 is a block diagram illustrating a high-level system for domain adaptation for structured output via disentangled representations, in accordance with the present invention.

Referring now to FIG. 3, a high-level system 300 for domain adaptation for structured output via disentangled representations is illustratively depicted in accordance with an embodiment of the present invention.

As shown in FIG. 3, system 300 includes a main task implementation device 305, a structureless domain adaptation device 360, and a structure-based domain adaptation device 400.

Main task implementation device 305 includes a main task device 310, and a main task loss function 340.

Main task device 310 implements a main task CNN 315 that accesses (for example, receives) the input images from two domains, which are denoted source (I_src) 320 and target (I_tar) 325. These inputs (I_src 320 and I_tar 325) are fed into main task CNN 315 to predict the task's output, again for both domains (O_src 330 and O_tar 335). In this instance the output is semantic segmentation, e.g., a semantic category such as road or car for each pixel in the image. Note that the approach is general and can be applied to other tasks. For example, the approach can also be applied to instance segmentation and depth estimation. The domains can each include any connected open subset of a finite-dimensional vector space. In this example, the domains include a set of images. Although the examples are described with respect to two domains for simplicity of explanation and expedience, the main task implementation device 305 can be applied to more than two domains.

Main task implementation device 305 (via main task device 310) outputs the predicted outputs for both domains, O_src 330 and O_tar 335, to structure-based domain adaptation device 400 and structureless domain adaptation device 360.

Main task loss function 340 accesses ground truth labels (GT_src) 345 for images from the source domain. GT_src 345 are used in a standard supervised loss function (for example, task loss 350) to train the main task CNN 315. Ground truth refers to the accuracy of the training set's classification for supervised learning techniques and is used in statistical models by the main task CNN 315 to prove or disprove hypotheses regarding images from the source domain. A loss function measures the inconsistency between predicted value (^y) and actual label (y). Main task loss function 340 determines the task loss 350 based on GT_src 345 and the predicted task output for the source domain O_src 330. Main task loss function 340 also outputs the ground truth GT_src 345 to structure-based domain adaptation device 400.

Structureless domain adaptation device 360 performs domain adaptation in the output space without considering the structure. Structureless domain adaptation device 360 trains the main task CNN 315 and handles images from the target domain (I_tar) 325 by applying an adversarial loss function (or regularization) 370 to encourage (e.g., result in) the distribution of both O_src 330 and O_tar 335 to be similar. Note that no ground truth data is available for the target domain. This adversarial loss function 370 has an internal CNN (not separately shown) that distinguishes between the two domains (I_src 320 and I_tar 325). The distinguished domains can then be used for distribution alignment.

Structure-based domain adaptation device 400 performs domain adaptation by considering the structure in the output space, as described in further detail below with respect to FIG. 4. Structure-based domain adaptation device 400 clusters the ground truth label patches into K categories (where K is a hyper-parameter chosen by the user), which are then used as additional classification loss on the label space and to encourage the different types of structures in the labels to be separated. Consequently, Structure-based domain adaptation device 400 disentangles the underlying feature representation. Feature disentanglement can be effective in enhancing the feature representation. Structure-based domain adaptation device 400 includes an additional adversarial regularization in the training process to encourage features from the different domains to show similar characteristics.

Figure 4:
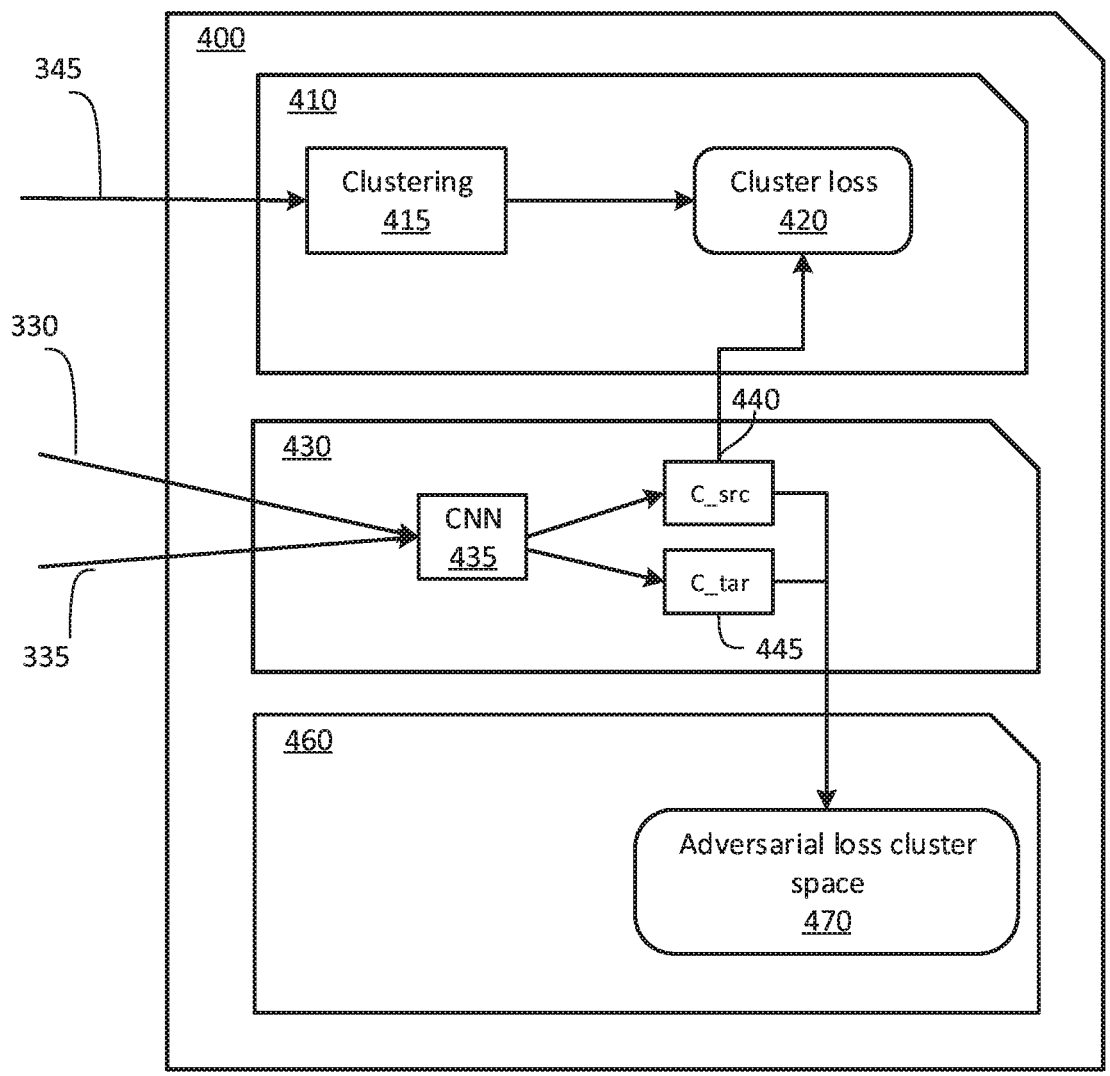
FIG. 4 is a block diagram illustrating a system for domain adaptation for structured output via disentangled representations, in accordance with the present invention.

Referring now to FIG. 4, structure-based domain adaptation device 400 is illustratively depicted in accordance with an embodiment of the present invention.

Structure-based domain adaptation device 400 performs domain adaptation by considering the structure in the output space. Structure-based domain adaptation device 400 includes a clustering component 410 that clusters the output/label space, a predicting component 430 that predicts the structure of label patches, and an adversarial loss component 460 that determines an adversarial loss to align domains on the structural level.

Clustering component 410 clusters the output/label space. Clustering component 410 clusters the ground truth data of the source domain 345 into K clusters to identify structure in the output space, where K is a pre-defined hyper-parameter. For application of semantic segmentation, clustering component 410 extracts and clusters 415 patches of the label map. Thus, each patch is assigned with a "synthetic" category, which is used to compute a classification (cluster) loss 420 for the output of predicting component 430. The synthetic category is defined by the clustered content of each patch (e.g., the clustered label patches).

The clustering of label patches implemented by clustering component 410 introduces a different (for example, additional) form of supervision for the main task CNN 315 that is to be trained and enables additional (adversarial) regularization between the two domains (e.g., by adversarial loss component, described herein below).

Predicting component 430 predicts the structure of label patches. The predicted output of the main task CNN 315 (O_src 330 and O_tar 335) (as described with respect to FIG. 3, herein above) is input to another CNN 435 that predicts the cluster assignment (C_src 440 and C-tar 445, respectively) for each patch in the O_src 330 and O_tar 335. The training signal for this additional CNN 435 comes from the cluster loss 420 defined by clustering component 410. Note that this additional CNN 435 is only required during the training phase of the entire framework.

Adversarial loss component 460 determines the adversarial loss to align domains on the structural level. With the ground truth data for the actual task, cluster ground truth is only available for the source domain. To overcome the gap between source and target domains, adversarial loss component 460 implements a loss function (adversarial loss on cluster space 470) acting on the output of the cluster predictions (C_src 440 and C-tar 445) from the predicting component 430. The gap is the result of images captured under various environments (e.g., weather, lighting condition) or camera settings (e.g., field-of-view, camera angle). This loss function not only affects the CNN 435 parameters from the predicting component 430 but also the parameters of the main task CNN 315 through back-propagation. In this way, the clustered label patches influence the main task CNN 315 to produce features that better handle the domain gap and ultimately give better results for the task. The structure-based adversarial loss can adapt features that are aware of the gap resulting from different cameras that produce various field-of-view images.

The structure-based domain adaptation device 400 implements a domain adaptation technique that employs an adversarial regularization in the output domain, for instance the label map in semantic segmentation, to align both domains where annotations are only provided for one of the domains. In contrast to systems that rely on a regularization technique in the feature space that encourages the features of images from both domains to follow the same distribution, structure-based domain adaptation device 400 implements a regularization that integrates the structure of the output label space to disentangle the feature space and thus ease domain adaptation. Specifically, patches of the label space from the training data in a first domain (for example, domain A) are extracted and clustered into K categories. K is a hyper-parameter chosen by the user. A hyper-parameter is a parameter whose value is set before the learning process begins. Each patch is thus assigned with one of the categories, which can be used as an additional classification loss function during training. Importantly, this additional task implemented by structure-based domain adaptation device 400 allows integrating another adversarial regularization based on the classification of the label space into the K clusters.

Figure 5:
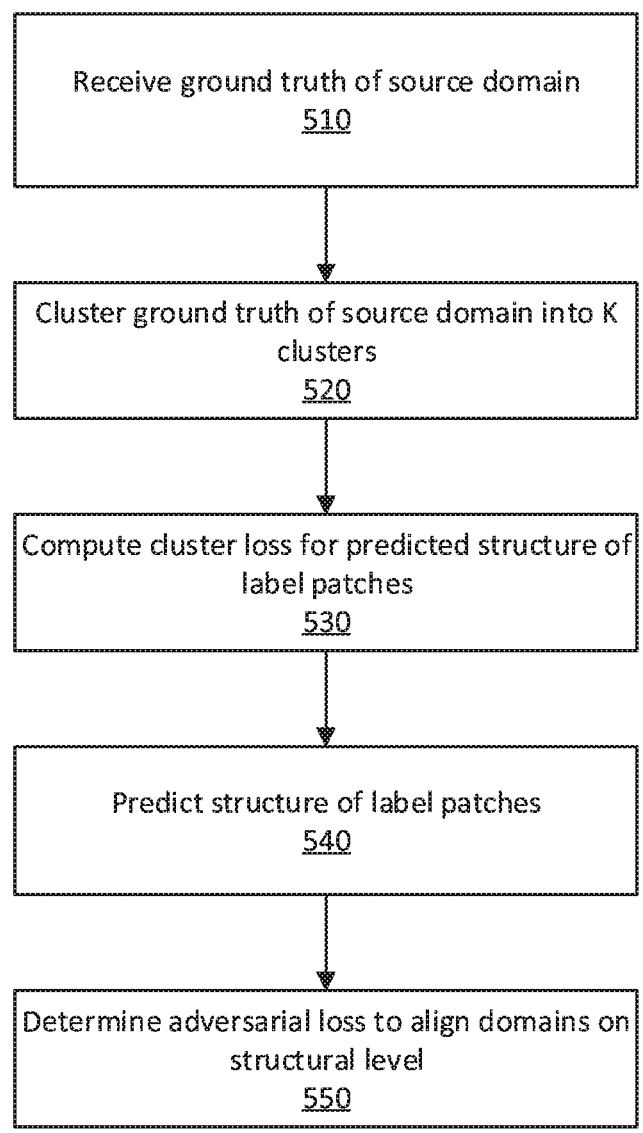
FIG. 5 is a flow diagram illustrating a method for domain adaptation for structured output via disentangled representations, in accordance with the present invention.

Referring now to FIG. 5, a method 500 for domain adaptation for structured output via disentangled representations is illustratively depicted in accordance with an embodiment of the present invention.

At block 510, structure-based domain adaptation device 400 receives ground truth of the source domain, GT_src 345. GT_src 345 are used in a standard supervised loss function (for example, task loss) 350 to train the main task CNN 315.

At block 520, structure-based domain adaptation device 400 clusters ground truth of source domain (GT_src 345) into K clusters (for semantic segmentation into a semantic category such as road, building, or car for each pixel in the image). For example, structure-based domain adaptation device 400 extracts and clusters patches of the label map and assigns a synthetic category to each of the clustered patches.

At block 530, structure-based domain adaptation device 400 computes a cluster loss for the predicted structure of label patches. Structure-based domain adaptation device 400 computes the cluster loss using the synthetic categories for the clustered patches.

At block 540, structure-based domain adaptation device 400 predicts the structure of label patches. The predicted output of the main task (for example, O_src 330 and O_tar 335) is input to a CNN (for example, CNN 435) of structure-based domain adaptation device 400 that predicts the cluster assignment for each patch in the O_src 330 and O_tar 335. The training signal for CNN 435 is received from the cluster loss determined at block 530.

At block 550, structure-based domain adaptation device 400 determines the adversarial loss to align domains on structural level, such as the predicted structure of label patches determined at block 540. The adversarial loss is a loss function in which a discriminator provides a mechanism to "learn" what is realistic. This loss function affects the CNN 435 parameters from block 540 and the parameters of the CNN 315 from the main task through back-propagation. In this way, the clustered label patches influence the actual task CNN 315 to produce features that better handle the domain gap and ultimately give better results for the task at hand. These features can include, for example, aligning the structural patch information across domains.

Figure 6:
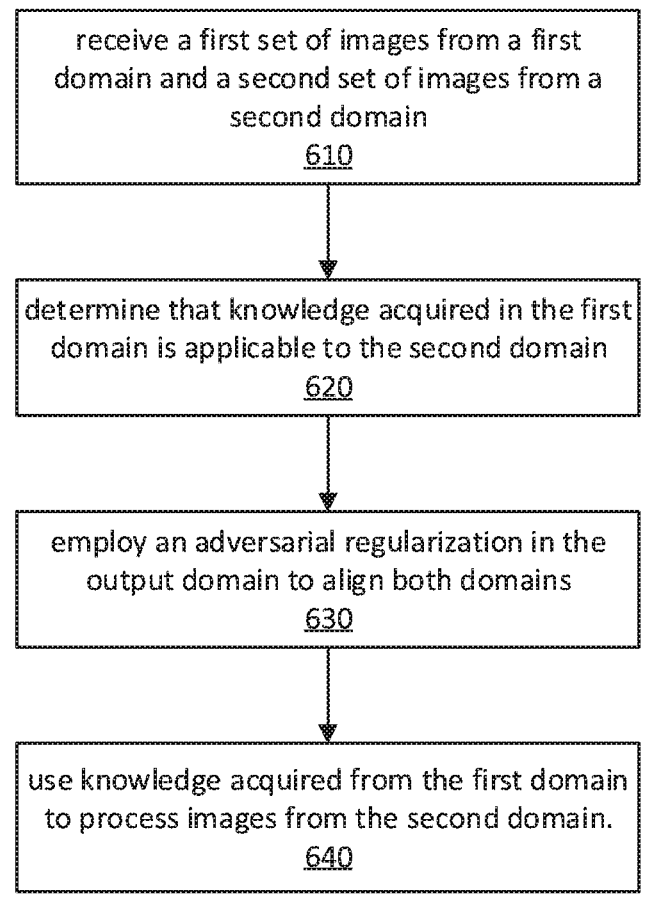
FIG. 6 is a flow diagram illustrating a method for processing images based on domain adaptation for structured output via disentangled representations, in accordance with the present invention.

Referring now to FIG. 6, a method 600 for processing images based on domain adaptation for structured output via disentangled representations is illustratively depicted in accordance with an embodiment of the present invention.

At block 610, structure-based domain adaptation device 400 receives a first set of images from a first domain and a second set of images from a second domain. The images may describe different weather or lighting conditions under which the images have been captured, different architectural styles of buildings or types of roads, etc.

At block 620, structure-based domain adaptation device 400 determines that knowledge acquired in the first domain is applicable to the second domain. For example, structure-based domain adaptation device 400 can determine that annotations are only provided for the first domain. The annotations can include, for semantic segmentation, pixel-level semantic labels, such as car, person, and road, etc. Other features that can be transferred between the domains are the image condition such as an image style, a lighting/weather condition, etc.

At block 630, structure-based domain adaptation device 400 employs an adversarial regularization in the output domain, for instance the label map in semantic segmentation, to align both domains where, for example, annotations are only provided for one of the domains. Aligning the domains in this instance ensures that feature representations (or knowledge) can be transferred from one domain (source) to another domain (target).

For example, structure-based domain adaptation device 400 can implement the process of method 500, described with respect to FIG. 5, herein above.

At block 640, structure-based domain adaptation device 400 uses knowledge acquired from the first domain (for example, the annotations from the first domain) to process images from the second domain. For example, the structure-based domain adaptation device 400 can acquire annotations for training data in the second domain. The successful domain adaptation technique can significantly reduce the costs (in terms of time and money) for acquiring annotations for training data.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for domain adaptation for structured output via disentangled representations, comprising:
   receiving a ground truth of a source domain, wherein the ground truth is used in a task loss function for a first convolutional neural network that predicts at least one output based on inputs from the source domain and a target domain;
   clustering the ground truth of the source domain into a predetermined number of clusters;
   predicting, via a second convolutional neural network whose inputs are connected to outputs of the first convolutional neural network, a structure of label patches, wherein the structure includes an assignment of each of the at least one output of the first convolutional neural network to the predetermined number of clusters;
   computing, by a processor device, a cluster loss fhr the predicted structure of label patches, wherein the second convolutional neural network is trained by a training signal based on the cluster loss and is unused subsequent to training of a system framework including the first and second convolutional neural networks; and
   applying an adversarial loss function to the predicted structure of label patches to align the source domain and the target domain on a structural level.

2. The method as recited in claim 1, further comprising: processing images from the target domain based on knowledge acquired in the source domain.

3. The method as recited in claim 1, further comprising: processing images from the target domain based on annotations acquired in the source domain.

4. The method as recited in claim 1, wherein the predetermined number is K, wherein K is a hyperparameter chosen by a user.

5. The method as recited in claim 1, wherein clustering the ground truth of the source domain into the predetermined number of clusters further comprises:
   assigning a synthetic category to each of the label patches.

6. The method as recited in claim 1, wherein clustering the ground truth of the source domain into the predetermined number of clusters further comprises:
   extracting and clustering the label patches for semantic segmentation.

7. The method as recited in claim 1, wherein clustering the ground truth of the source domain into the predetermined number of clusters provides supervision for the first convolutional network and enables an additional adversarial regularization between the source domain and the target domain.

8. The method as recited in claim 1, wherein the ground truth is only available for the source domain.

9. The method as recited in claim 1, further comprising:
   implementing back-propagation based on the adversarial loss to modify parameters associated with the first convolutional network.

10. The method as recited in claim 1, further comprising:
    implementing back-propagation based on the adversarial loss to modify parameters associated with the second convolutional network.

11. A computer system for domain adaptation for structured output via disentangled representations, comprising:
    a processor device operatively coupled to a memory device, the processor device being configured to:
    receive a ground truth of a source domain, wherein the ground truth is used in a task loss function for a first convolutional neural network that predicts at least one output based on inputs from the source domain and a target domain;
    cluster the ground truth of the source domain into a predetermined number of clusters;
    predict, via a second convolutional neural network whose inputs are connected to outputs of the first convolutional neural network, a structure of label patches, wherein the structure includes an assignment of each of the at least one output of the first convolutional neural network to the predetermined number of clusters;
    compute a cluster loss for the predicted structure of label patches. wherein the second convolutional neural network is trained by a training sigual based on the cluster loss and unused subsequent to training of a system framework including the first and second convolutional neural networks; and
    apply an adversarial loss function to the predicted structure of label patches to align the source domain and the target domain on a structural level.

12. The system as recited in claim 11, wherein the predetermined number is K, wherein K is a hyperparameter chosen by a user.

13. The system as recited in claim 11, wherein, when clustering the ground truth of the source domain into the predetermined number of clusters, the processor device is further configured to:
    assign a synthetic category to each of the label patches.

14. The system as recited in claim 11, wherein, when clustering the ground truth of the source domain into the predetermined number of clusters, the processor device is further configured to:
    extract and cluster the label patches for semantic segmentation.

15. The system as recited in claim 11, wherein, when clustering the ground truth of the source domain into the predetermined number of clusters, the processor device is further configured to:

provide supervision for the first convolutional network and enable an additional adversarial regularization between the source domain and the target domain.

16. A computer program product for domain adaptation for structured output via disentangled representations, the computer program product comprising a non-transitory computer readable storage medium having program instructions embodied therewith, the program instructions executable by a computing device to cause the computing device to perform the method comprising:

receiving a ground. truth of a source domain, wherein the ground truth is used in a task loss function for a first convolutional neural network that predicts at least one output based on inputs from the source domain and a target domain;

clustering the ground truth of the source domain into a predetermined number of clusters;

predicting, via a second convolutional neural network whose inputs are connected to outputs of the first convolutional neural network, a structure of label patches, wherein the structure includes an assignment of each of the at least one output of the first convolutional neural network to the predetermined number of clusters;

computing, by a processor device, a cluster loss for the predicted structure of label patches, wherein the second convolutional neural network is trained by a training signal based on the cluster loss and is unused subsequent to training of system framework including the first and second convolutional neural networks; and applying an adversarial loss function to the predicted structure of label patches to align the source domain and the target domain on a structural level.

* * * * *